United States Patent [19]
Kuboki et al.

[11] Patent Number: 6,043,333
[45] Date of Patent: Mar. 28, 2000

[54] MODIFIED EPOXY RESIN, EPOXY RESIN COMPOSITION AND CURED PRODUCT THEREOF

[75] Inventors: Kenichi Kuboki, Chiba-ken; Yoshitaka Kajiwara, Saitama-ken; Yoshio Shimamura, Ibaraki-ken; Yasumasa Akatsuka, Saitama-ken, all of Japan

[73] Assignee: Nippon Kayaku Kabushiki Kaisha, Tokyo, Japan

[21] Appl. No.: 08/912,095

[22] Filed: Aug. 15, 1997

[30] Foreign Application Priority Data

Aug. 23, 1996 [JP] Japan .................................... 8-239981
Dec. 13, 1996 [JP] Japan .................................... 8-352391
Jul. 7, 1997 [JP] Japan .................................... 9-195253

[51] Int. Cl.[7] ............................ C08L 63/04; C08G 59/08
[52] U.S. Cl. ............................ 528/98; 528/102; 528/104
[58] Field of Search ............................... 528/87, 98, 102, 528/104

[56] References Cited

U.S. PATENT DOCUMENTS 5,567,749 10/1996 Sawamura et al. ..................... 523/443

FOREIGN PATENT DOCUMENTS 0 579 301   1/1994   European Pat. Off. .
1-230619    9/1989   Japan .

*Primary Examiner*—Jeffrey C. Mullis
*Attorney, Agent, or Firm*—Nields, Lemack & Dingman

[57] ABSTRACT

Modified epoxy resin having an elevated softening point obtained from an epoxy resin having a low softening point without modifying the properties of the cured product and to improve the workability in the production of an epoxy resin composition. The modified epoxy resin is obtained by adding 4,4'-dihydroxybiphenyl to a specified phenol compound and epoxidizing the resultant mixture. Also disclosed is an epoxy resin composition containing the modified epoxy resin and the cured product thereof.

17 Claims, No Drawings

MODIFIED EPOXY RESIN, EPOXY RESIN COMPOSITION AND CURED PRODUCT THEREOF

DETAILED DESCRIPTION OF THE INVENTION

1. Technical Field to Which the Invention Belongs

The present invention relates to a modified epoxy resin, an epoxy resin composition and a cured product thereof usable for producing insulating materials for electric and electronic components typified by that used for encapsulating a semiconductor, various composite materials typified by laminated boards (printed-wiring boards) and CFRP (carbon fiber reinforced plastics), adhesives and coating materials.

2. Prior Art

Epoxy resins having excellent workability and also curing products thereof having excellent electrical properties, heat resistance, adhesive properties, moisture resistance (water resistance), etc. are widely used in the fields of, for example, electric and electronic components, structural materials, adhesives and coating materials.

PROBLEM TO BE SOLVED BY THE INVENTION

However, a higher purity and further improvement in the properties such as heat resistance, moisture resistance, adhesion and low viscosity for filling a filler to a high extent are demanded because of the recent rapid progress in the electric and electronic fields. On the other hand, it is desired that the epoxy resin is in a solid form at room temperature for improving the workability. As a structural material, the epoxy resin is demanded to be light in weight and to have excellent mechanical properties when it is used as an aerospace material or a material for tools and equipment for leisure and sports and, at the same time, the resin is demanded to have a low viscosity so as to improve the workability thereof. Although various proposals were made on the epoxy resin compositions for satisfying the demands, they are not yet satisfactory.

MEANS FOR SOLVING THE PROBLEM

After intensive investigations made for the purpose of developing the modified epoxy resins, epoxy resin composition and cured product thereof having the above-described properties, the inventors have completed the present invention.

Namely, the present invention relates to:

(1) a modified epoxy resin obtained by the glycidylation of a mixture of (a) a phenol compound represented by the formula (1):

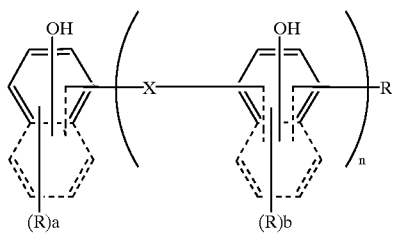

wherein X represents a hydrocarbon group or hiydroxylhydrocarbon group having 1 to 14 carbon atoms, a represents an integer of 1 to 6, b represents an integer of 1 to 5, R's represent a hydrogen atom, a halogen atom, a hydrocarbon group having 1 to 8 carbon atoms or an aryl group independently from each other, and n represents an average number which is 1 to 10 and (b) 4,4'-dihydroxybiphenyl, and having a softening point of not higher than 120° C. and not lower than 60° C., (2) the modified epoxy resin according to the above item (1), wherein [1.6×the amount of the component (b) in the mixture of components (a) and (b)]/{[the amount of the component (a) in the mixture of components (a) and (b)]×[1+56/hydroxyl group equivalent of component (a)]} is not higher than 0.3, (3) the modified epoxy resin according to the above item (1) or (2), wherein X in the formula (1) is a hydrocarbon group having 8 to 14 carbon atoms, (4) the modified epoxy resin according to any of the above items (1) to (3), wherein the compound of the formula (1) is 1,1-bis-(4-hydroxyphenyl)-3,3,5-trimethyl-cyclohexane, (5) the modified epoxy resin according to any of the above items (1) to (3), wherein the compound of the formula (1) is that represented by the formula (2):

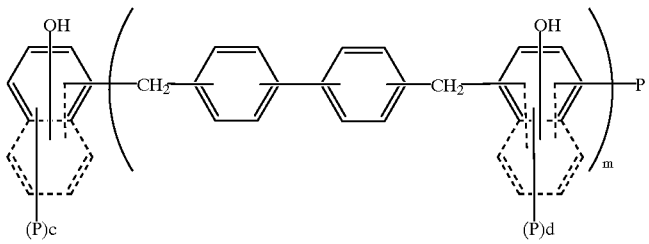

wherein c represents an integer of 1 to 6, d represents an integer of 1 to 5, P's represent a hydrogen atom, a halogen atom, a hydrocarbon group having 1 to 8 carbon atoms or an aryl group independently from each other, and m represents an average number which is 1 to 10, (6) the modified epoxy resin according to the above item (1), wherein the component (a) is an alkylphenol novolak, (7) the modified epoxy resin according to the above item (6), wherein the component (a) is o-cresol novolak, (8) the modified epoxy resin according to the above item (6) or (7), wherein the value of (weight of dinuclear component)/(weight of trinuclear component) is not higher than 0.4, (9) the modified epoxy resin according to the above item (6) or (7), wherein the relative amount of the tetranuclear component is at least 30% by weight and the relative amount of the total of mononuclear to trinuclear components is not larger than 20% by weight in the component (a),

(10) the modified epoxy resin according to any of the above items (6) to (9), wherein the component (a) is an alkylphenol novolak obtained by condensing an alkylphenol with formaldehyde in the presence of a hydroxycarboxylic acid having a carboxyl group and an alcoholic hydroxyl group in the molecule as the catalyst,

(11) the modified epoxy resin according to any of the above items (7) to (10), wherein the component (a) is an o-cresol novolak having a softening point of not higher than 100° C.,

(12) the modified epoxy resin according to any of the above items (1) to (11), wherein the component (a) and component (b) are contained in the mixture in a component (b) to component (a) ratio by weight of not higher than 0.4,

(13) the modified epoxy resin according to any of the above items (1) to (11), wherein the component (a) and component (b) are contained in the mixture in a component (b) to component (a) ratio by weight of below 0.25 and at least 0.05,

(14) an epoxy resin composition containing the modified epoxy resin as set forth in any of the above items (1) to (13),

(15) the epoxy resin composition according to the above item (14), which is prepared for encapsulating a semiconductor, and

(16) a cured product produced by curing the epoxy resin composition as set forth in the above item (14) or (15).

MODE FOR CARRYING OUT THE INVENTION

The modified epoxy resin of the present invention can be obtained by the glycidylation reaction of a mixture (hereinafter simply referred to as "phenol mixture") of a phenol compound represented by the above formula (1) [component (a); hereinafter referred to as "(a)"] and 4,4'-dihydroxybiphenyl [component (b); hereinafter referred to as "(b)"] with an epihalohydrin. Even though the glycidylation product of the compound of the formula (1) used singly is in a semisolid or liquid form, the modified epoxy resin having a high softening point can be obtained while keeping the viscosity equal to or lower than that of the compound by the glycidylation thereof in the form of a mixture with 4,4'-dihydroxybiphenyl. Even though the mixing ratio of (b)/(a) in the phenol mixture is not particularly limited, the weight ratio of (b)/(a) is usually not above 0.4, preferably less than 0.25 and at least 0.05. [1.6×the amount of (b) in the mixture of (a) and (b)] /{[the amount of (a) in the mixture of (a) and (b)]×(1+56/hydroxyl group equivalent of (a)]} is preferably not higher than 0.3 and at least 0.05. When the amounts of (a) and (b) are not within the above-described range, the following problems might occur: crystals may be formed in the course of the synthesis of the modified epoxy resin; and as for the properties of the cured, modified epoxy resin, the properties peculiar to the cured epoxide may become remarkable to cause troubles in the heat resistance and moisture resistance; the modified epoxy resin synthesized by using the low molecular (a) may be neither crystalline nor solidified; and the lowering in the viscosity may be insufficient.

Examples of the compounds of the formula (1) usable herein include bisphenol A, bisphenol F, 1,1-bis-(4-hydroxyphenyl)-cyclohexane, 1,1-bis-(4-hydroxyphenyl)-3,3,5-trimethylcyclohexane, terpene diphenol, phenol novolak, polymers of phenols/dicyclopentadiene, polycondensates of phenols/xylylene glycols, compounds of the above formula (2), polycondensates of phenols and a compound of the formula (2), polycondensates of phenols/hydroxybenzaldehydes, and alkylphenol novolaks prepared by condensing phenols having an alkyl group with formaldehyde. However, the compounds of the formula (1) are not limited to those listed above. Examples of the phenols in the polycondensates include phenol, cresol, xylenol, tert-butylcresol and naphthol. However, the phenols are not limited to them.

Among these compounds, preferred compounds are 1,1-bis-(4-hydroxyphenyl)-3,3,5-trimethyl-cyclohexane, terpene diphenol, polymers of phenols/dicyclopentadiene, polycondensates of phenols/xylylene glycol, compounds of the above formula (2), polycondensates of phenols/hydroxybenzaldehydes and alkylphenol novolaks, 1,1-Bis-(4-hydroxyphenyl)-3,3,5-trimethyl-cyclohexane, compounds of the above formula (2) or alkylphenol novolaks are particularly preferred. In the alkylplhenol novolaks, o-cresol novolaks and particularly o-cresol novolaks having a softening point of not above 100° C. are preferred.

One of the characteristic features of the modified epoxy resin of the present invention is that no blocking is caused. When an alkylphenol novolak is selected as the compound of the formula (1), the smaller the amount of the low nuclear component (particularly dinuclear component) having a small number of aromatic rings contained in the molecule of the alkylphenol novolak, the more remarkable the effect. Therefore, it is preferred to use an alkylphenol novolak having a (weight of dinuclear component)/(weight of trinuclear component) of not higher than 0.4 or an alkylphenol novolak containing at least 30% by weight of a tetranuclear component and not more than 20% by weight of the total of mono- to trinuclear components, particularly 35 to 100% by weight of the tetranuclear component and 0 to 15% by weight of the total of mono- to trinuclear components.

The term "x-nuclear component" for the alkylphenol novolaks described above and below indicates that the number of the aromatic rings in the molecule of the alkylphenol novolak is x. The weight ratio of the x-nuclear components to each other can be determined by GPC (gel permeation chromatography) or the like.

The alkylphenol novolaks having a smaller low-nuclear component content as described above can be obtained by, for example, a method wherein the low-nuclear component is removed by the molecular distillation or washing with water, or a method wherein the mononuclear dimethylol compound and dinuclear dimethylol compound are once synthesized and then they are condensed with an excess alkylphenol. However, the costs of these methods comprising many steps are high. This problem can be solved by, for example, a method wherein an alkylphenol is condensed with formaldehyde in the presence of a hydroxycarboxylic acid having both an alcoholic hydroxyl group and a carboxyl group in the molecule as the catalyst as described in Japanese Patent Laid-Open No. 3257/1996. By this method, an alkylphenol novolak containing a smaller amount of a low-nuclear component and having a narrower molecular weight distribution than those obtained by using a conventional catalyst can be obtained.

The hydroxycarboxylic acids used for the reaction include lactic acid, malic acid, mandelic acid, tartaric acid, citric acid, etc. They are usable either singly or in combination of two or more of them. Further, they are usable together with hydrochloric acid, sulfuric acid, oxalic acid, p-toluenesulfonic acid, etc. The amount of the hydroxycarboxylic acid is usually 0.01 to 5.0 mol, preferably 0.05 to 4.0 mol, still preferably 0.1 to 3.0 mol, for 1.0 mol of formaldehyde. The condensation reaction may be conducted at a reflux temperature for 1 to 10 hours. After the completion of the reaction, the reaction product is repeatedly washed with water, as it is or after dissolving in a solvent such as toluene, xylene or methyl isobutyl ketone, to remove the hydroxycarboxylic acid catalyst, and then the solvent or unreacted alkylphenol and formaldehyde are removed by heating under reduced pressure.

Examples of the epihalohydrins used for the glycidylation reaction for obtaining the modified epoxy resin of the present invention include epichlorohydrin, β-methylepichlorohydrin, epibromohydrin, β-methylepibromohydrin, epiiodohydrin and β-ethylepichlorohydrin. Among them, epichlorohydrin easily available on an industrial scale at a low cost is preferred. The glycidylation reaction per se can be conducted by a well known method.

For example, the reaction is conducted by adding a solid alkali metal hydroxide such as sodium hydroxide or potassium hydroxide at once or gradually to the above-described mixture of the phenol mixture with the epihalohydrin usually at 20 to 120° C. for 0.5 to 10 hours. The alkali metal hydroxide used may be in the form of an aqueous solution thereof. In this case, this method may be conducted as follows: the alkali metal hydroxide is continuously added and simultaneously water and the epihalohydrin are continuously distilled out of the reaction mixture under reduced pressure or atmospheric pressure, the obtained distillate is separated, water is removed and the epihalohydrin is continuously returned into the reaction mixture.

In this method, the amount of the epihalohydrin used is usually 0.5 to 10 mol, preferably 1.0 to 6.0 mol, per equivalent of hydroxyl group in the phenol mixture. The amount of the alkali metal hydroxide used is usually 0.5 to 1.5 mol, preferably 0.7 to 1.2 mol, per equivalent of hydroxyl group in the phenol mixture. When an aprotic polar solvent such as dimethyl sulfone, dimethyl sulfoxide, dimethyl-formamide or 1,3-dimethyl-2-imidazolidinone is added, the modified epoxy resin having a low hydrolyzable halogen concentration as defined below is obtained. Such a modified epoxy resin is suitable for use for encapsulating electronic materials. The amount of the aprotic polar solvent used is usually 5 to 200% by weight, preferably 10 to 100% by weight, based on the epihalohydrin. The reaction is accelerated also by adding an alcohol such as methanol or ethanol or a cyclic ether such as 1,4-dioxane other than the above-described solvent. In this case, the hydrolyzable halogen concentration is higher than that obtained by using the aprotic polar solvent but lower than that obtained without using such a solvent. Further, toluene, xylene, etc. are also usable. The hydrolyzable halogen concentration can be determined by, for example, placing the modified epoxy resin in dioxane and 1 N-KOH/ethanol solution, refluxing the resultant mixture for several ten minutes and conducting the titration with a silver nitrate solution.

The modified epoxy resin of the present invention can be obtained also by conducting the reaction of the mixture of the phenol mixture with the excess epihalohydrin in the presence of a quaternary ammonium salt such as tetramethylammonium chloride, tetramethylammonium bromide or trimethylbenzylammonium chloride as the catalyst usually at 50 to 150° C. for 1 to 10 hours, adding an alkali metal hydroxide such as sodium hydroxide or potassium hydroxide in the form of the solid or an aqueous solution thereof to the obtained halohydrin ether of the phenol mixture and conducting the reaction at 20 to 120° C. for 1 to 10 hours to close the ring of the halohydrin ether, thereby obtaining the modified epoxy resin of the present invention. The amount of the quaternary ammonium salt in this case is 0.001 to 0.2 mol, preferably 0.05 to 0.1 mol, per equivalent of the hydroxyl group in the phenol mixture. The amount of the alkali metal hydroxide is usually 0.8 to 1.5 mol, preferably 0.9 to 1.1 mol, per equivalent of the hydroxyl group in the phenol mixture.

Usually the excessive epihalohydrin, a solvent, etc. are removed from the reaction product by heating under reduced pressure after washing it with water or without washing, the reaction product is dissolved in a solvent such as toluene, methyl isobutyl ketone or methyl ethyl ketone, an aqueous solution of an alkali metal hydroxide such as sodium hydroxide or potassium hydroxide is added thereto and the reaction is conducted again to obtain the modified epoxy resin of the present invention having a low hydrolyzable halogen concentration. The amount of the alkali metal hydroxide used is 0.01 to 0.2 mol, preferably 0.05 to 0.1 mol, per equivalent of hydroxyl group of the phenol mixture. The reaction temperature is usually 50 to 120° C. and the reaction time is usually 0.5 to 2 hours. After the completion of the reaction, the by-produced salts are removed by filtration, washing with water, etc., and then the solvent such as toluene, methyl isobutyl ketone or methyl ethyl ketone is distilled off by heating under reduced pressure to obtain the modified epoxy resin of the present invention having a low hydrolyzable halogen concentration. The modified epoxy resin of the present invention thus obtained contains a very small amount of a compound having a bond represented by the following formula (A):

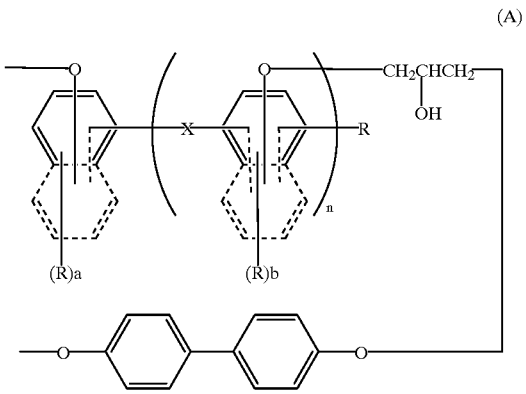

wherein X, R, a and b are the same as defined in the above formula (1) in its molecule. Therefore, as compared with a mere mixture of the glylcidyl derivatives (a) and (b), the compatibility of the components of the epoxy resin with each other is improved and further the storability (blocking resistance) of the epoxy resin composition is improved when the product is incorporated into the epoxy resin composition of the present invention as will be described below.

The softening point of the modified epoxy resin of the present invention is not above 120° C. and not below 60° C. When the softening point is below 60° C., the storability is poor and, on the contrary, when it is above 120° C., the workability is impaired in kneading the epoxy resin composition with a kneader or the like and the kneading of the epoxy resin composition becomes uneven.

The description will be made on the epoxy resin composition of the present invention.

In the epoxy resin composition of the present invention, the modified epoxy resin of the present invention is usable either singly or in combination with another epoxy resin. In the latter case, the relative amount of the modified epoxy resin of the present invention is preferably at least 30% by weight, particularly at least 40% by weight, based on the whole epoxy resins.

Examples of other epoxy resins usable in combination with the modified epoxy resin of the present invention include bisphenols, polycondensates of phenols (such as phenol, alkyl-substituted phenols, naphthol, alkyl-substituted naphthol, dihydroxybenzene or dihydroxynaphthalene) with an aldehyde, polymers of phenols with a diene compound, polycondensates of phenols with an aromatic dimethylol, biphenols, glycidyl ether epoxy resins which are glycidyl derivatives of alcohols, alicyclic epoxy resins, glycidylamine epoxy resins and glycidyl ester epoxy resins. These examples by no means limit the epoxy resins. They are usable either singly or in the form of a combination of two or more of them.

In a preferred embodiment, the epoxy resin composition of the present invention contains a curing agent. The curing agents usable herein include amine compounds, acid anhydride compounds, amide compounds, phenol compounds, etc. Examples of the curing agents usable herein include diaminodiphenylmethane, diethylenetriamine, triethylenetetramine, diaminodiphenylsulfone, isophoronediamine, dicyandiamide, polyamide resin synthesized from linolenic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, bisphenols, polycondensates of phenols (such as phenol, alkyl-substituted phenols, naphthol, alkyl-substituted naphthols, dihydroxybenzene or dihydroxynaplitlalene) and an aldehyde, polymers of phenols and a diene compound, polycondensates of phenols and an aromatic dimethylol, biphenols and modified biphenols, imidazole, $BF_3$-amine complexes and guanidine derivatives. The amount of the curing agent used is preferably 0.5 to 1.5 equivalents, particularly 0.6 to 1.2 equivalents, per equivalent of epoxy group of the epoxy resin. When the amount of the curing agent is below 0.5 equivalent or above 1.5 equivalent per equivalent of epoxy group, the curing might be incomplete and the excellent properties of the cured product might not be obtained.

The curing agent may be used in combination with a curing accelerator. Examples of the curing accelerators usable herein include imidazoles such as 2-methylimidazole, 2-ethylimidazole and 2-ethyl-4-methylimidazole; tertiary amines such as 2-(dimethylaminomethyl)phenol and 1,8-diaza-bicyclo(5,4,0)undecene-7; phosphines such as triphenylphosphine; and metal compounds such as tin octylate. The curing accelerator is used, if necessary, in an amount of 0.01 to 15 parts by weight for 100 parts by weight of the epoxy resin.

The epoxy resin composition of the present invention may further contain, if necessary, various additives such as an inorganic filler, e.g. molten silica, crystalline silica, porous silica, alumina, zircon, calcium silicate, calcium carbonate, silicon carbide, silicon nitride, boron nitride, zirconia, aluminum nitride, forsterite, steatite, spinel, mullite, titania and talc in a powdery, spherical or crushed form; a silane coupling agent; a mold-releasing agent; and a pigment; as well as various thermosetting resins.

Particularly when the epoxy resin composition for encapsulating a semiconductor is to be obtained, the amount of the above-described inorganic filler to be used is usually 80 to 92% by weight, preferably 83 to 90% by weight and still preferably 85 to 90% by weight, based on the epoxy resin composition.

The epoxy resin composition of the present invention is obtained by homogeneously mixing the above-described components in the relative amounts described above, and a preferred use thereof is for encapsulating semiconductors.

The epoxy resin composition of the present invention can be easily cured by a method similar to that known in the prior art. For example, the cured product of the present invention can be obtained by thoroughly mixing the epoxy resin with the curing agent and, if necessary, a curing accelerator, an inorganic filler, an additive and a thermosetting resin by means of, if necessary, an extruder, kneader, roll or the like to obtain the epoxy resin composition of the present invention, molding the epoxy resin composition by a melt casting method, transfer molding method, injection molding method or compression molding method and, if necessary, heating the obtained product to 80 to 200° C. The cured product of the present invention can be obtained also by dissolving the epoxy resin composition of the present invention in a solvent such as toluene, xylene, acetone, methyl ethyl ketone or methyl isobutyl ketone, impregnating a base material such as glass fibers, carbon fibers, polyester fibers, polyamide fibers, alumina fibers or paper with the obtained solution, heating and drying the impregnated base material to obtain a prepreg and molding the prepreg by a hot press method.

In this case, the solvent is used in an amount of usually 10 to 70% by weight, preferably 15 to 65% by weight, based on the sum of the epoxy resin composition of the present invention and the solvent.

EXAMPLES

The following Examples will further illustrate the present invention. The Examples by no means limit the present invention. The epoxy equivalent, melt viscosity, softening point and weight ratio of x-nuclear components to each other were determined under the conditions described below. In the Examples and Comparative Examples, parts are given by weight.

① Epoxy Equivalent

The epoxy equivalent was determined by a method according to JIS K-7236, and the unit thereof was g/eq.

② Melt Viscosity

The melt viscosity was determined by the cone plate method at 150° C.

Measuring machine: cone plate (ICI) high-temperature viscometer (a product of RESEARCH EQUIPMENT (LONDON) LTD.)

Cone No.: 3 (range of measuring: 0 to 20 P)

Amount of sample: 0.15±0.01 g

③ Softening Point

The softening point was determined by a method according to JIS-7234.

④ Blocking Resistance 1 kg of an epoxy resin in the form of marbles having a diameter of around 5 mm was fed into a 1.5 PET bottle, then left to stand in a constant-temperature bath at 35° C. for 72 hours and the welding state of the epoxy resin was examined. The results of the examination are given according to the following criteria in a column of the blocking resistance in Table 5:

⊚: The marbles were not welded with each other.

○: Although the marbles were slightly welded, they could be separated by hands.

Δ: The marbles were considerably welded. The trace of the marbles was recognized.

×: The marbles were completely solidified to form a mass of the resin.

⑤ Weight Ratio of x-nuclear Components

The sample was analyzed with a GPC analyzer, and the weight ratio of them was determined from area percentages of the peaks corresponding to the respective components.

GPC Analysis Conditions

Columns: Shodex KF-803 (two)+KF-802.5 (two)

Column temperature: 40° C.

Solvent: tetrahydrofuran

Detection: UV (254 nm)

Flow rate: 1 ml/min.

Example 1

55 parts of 1,1-bis-(4-hydroxyphenyl)-3,3,5-trimethylcyclohexane, 15.6 parts of 4,4'-hydroxy-biphenyl, 194 parts of epichlorohydrin (hereinafter referred to as "ECH"), and 100 parts of dimethyl sulfoxide (hereinafter referred to as "DMSO") were fed into a reactor, They were heated and stirred to obtain a solution. Then 54 parts of 40% aqueous sodium hydroxide solution was continuously dropped in the solution for a period of 4 hours while the temperature was kept at 45° C. and the pressure in the reactor was kept at 45 Torr. The reaction was thus conducted while ECH and water distilled off by the azeotropy were cooled and separated from each other and then only ECH as the organic layer was returned into the reactor. After the completion of the dropping of the aqueous sodium hydroxide solution, the reaction was conducted at 45° C. for 2 hours and at 70° C. for 30 minutes to obtain a reaction mixture. After repeated washing with water to remove salts formed as the by-products and dimethyl sulfoxide, excess epichlorohydrin was distilled off from the oil layer under heating under reduced pressure. 200 parts of methyl isobutyl ketone was added to the residue to dissolve it.

The methyl isobutyl ketone solution was heated to 70° C. and 4 parts of 30% aqueous sodium hydroxide solution was added thereto to conduct the reaction for 1 hour. The reaction liquid was repeatedly washed with water until the wash solution had become neutral.

Then methyl isobutyl ketone was distilled off from the oil layer by heating under reduced pressure to obtain 94 parts of the modified epoxy resin (E1) of the present invention.

Example 2

The same procedure as that of Example 1 was repeated except that the amount of ECH was altered to 150 parts. As a result, 95 parts of the modified epoxy resin (E2) of the present invention was obtained.

Example 3

The same procedure as that of Example 1 was repeated except that the amount of ECH was altered to 100 parts. As a result, 93 parts of the modified epoxy resin (E3) of the present invention was obtained.

Example 4

The same procedure as that of Example 2 was repeated except that the amounts of 1,1-bis-(4-hydroxyphenyl)-3,3,5-trimethylcyclohexane,4,4'-hydroxybiphenyl and 40% aqueous sodium hydroxide solution were altered to 59 parts, 12.5 parts and 53 parts, respectively. As a result, 96 parts of the modified epoxy resin (E4) of the present invention was obtained.

Example 5

The same procedure as that of Example 2 was repeated except that 1,1-bis-(4-hydroxyphenyl)-3,3,5-trimethylcyclohexane was replaced with 58 parts of dicyclopentadiene/phenol polymer (DPP series of Nippon Petrochemical Co., Ltd.; softening point: 89° C.) and the amounts of 4,4'-hydroxybiphenyl and 40% aqueous sodium hydroxide solution were altered to 14.4 parts and 53 parts, respectively. As a result, 92 parts of the modified epoxy resin (E5) of the present invention was obtained.

Example 6

The same procedure as that of Example 2 was repeated except that 1,1-bis-(4-hydroxyphenyl)-3,3,5-trimethylcyclohexane was replaced with 54 parts of phenol/xylylene glycol polycondensate (Milex XL-225-4L; a product of Mitsui Toatsu Chemicals, Inc.; softening point: 52° C.) and the amounts of 4,4'-hydroxybiphenyl and 40% aqueous sodium hydroxide solution were altered to 17.5 parts and 52 parts, respectively. As a result, 95 parts of the modified epoxy resin (E6) of the present invention was obtained.

Example 7

The same procedure as that of Example 2 was repeated except that 1,1-bis-(4-hydroxyphenyl)-3,3,5-trimethylcyclohexane was replaced with 54 parts of terpene diphenol (YP-90; a product of Yasuhara Chemical Co., Ltd.) and that the amounts of 4,4'-hydroxybiphenyl and 40% aqueous sodium hydroxide solution were altered to 17.5 parts and 52 parts, respectively. As a result, 97 parts of the modified epoxy resin (E7) of the present invention was obtained.

Example 8

The same procedure as that of Example 2 was repeated except that 1,1-bis-(4-hydroxyphenyl)-3,3,5-trimethylcyclohexane was replaced with 62 parts of a compound [softening point: 155° C., m=1.1 (average)] represented by the following formula (3):

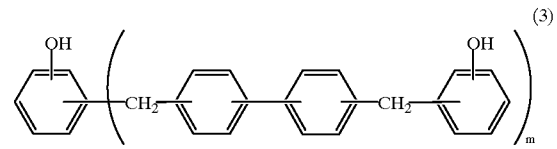

and that the amounts of 4,4'-hydroxybiphenyl and 40% aqueous sodium hydroxide solution were altered to 12.5 parts and 46 parts, respectively. As a result, 95 parts of the modified epoxy resin (E8) of the present invention was obtained.

Example 9

The same procedure as that of Example 2 was repeated except that 1,1-bis-(4-hydroxyphenyl)-3,3,5-trimethylcyclohexane was replaced with 45.6 parts of phenol/salicyl aldehyde polycondensate (softening point: 110° C., melt viscosity: 9.2 P) and that the amounts of 4,4'-hydroxybiphenyl and 40% aqueous sodium hydroxide solution were altered to 17.5 parts and 66 parts, respectively. As a result, 94 parts of the modified epoxy resin (E9) of the present invention was obtained.

Example 10

The same procedure as that of Example 2 was repeated except that 1,1-bis-(4-hydroxyphenyl)-3,3,5- trimethylcyclohexane was replaced with 77.8 parts of phenol/salicyl aldehyde polycondensate (softening point: 110° C., melt viscosity: 9.2 P) and that the amounts of 4,4'-hydroxybiphenyl and 40% aqueous sodium hydroxide solution were altered to 18.6 part and 100 parts, respectively. As a result, 141 parts of the modified epoxy resin (E10) of the present invention was obtained.

Example 11

The same procedure as that of Example 2 was repeated except that 1,1-bis-(4-hydroxyphenyl)-3,3,5-trimethylcyclohexane was replaced with 83 parts of phenol/salicyl aldehyde polycondensate (softening point: 120° C.) and that the amounts of 4,4'-hydroxybiphenyl and 40% aqueous sodium hydroxide solution were altered to 17 parts and 104 parts, respectively. As a result, 145 parts of the modified epoxy resin (E11) of the present invention was obtained.

Comparative Example 1

The same procedure as that of Example 1 was repeated except that 81 parts of only 1,1-bis-(4-hydroxyphenyl)-3,3,5-trimethylcyclohexane was used without using 4,4'-dihydroxybiphenyl. As a result, 105 parts of an epoxy resin (R1) was obtained.

Comparative Example 2

The same procedure as that of Comparative Example 1 was repeated except that 1,1-bis-(4-hydroxyphenyl)-3,3,5-trimethylcyclohexane was replaced with 84 parts of dicyclopentadiene/phenol polymer (DPP series of Nippon Petrochemical Co., Ltd.; softening point: 89° C.). As a result, 107 parts of an epoxy resin (R2) was obtained.

Comparative Example 3

The same procedure as that of Comparative Example 1 was repeated except that 1,1-bis-(4-hydroxyphenyl)-3,3,5-trimethylcyclohexane was replaced with 85 parts of Milex XL-225-4L; a product of Mitsui Toatsu Chemicals, Inc., softening point: 52° C.). As a result, 109 parts of an epoxy resin (R3) was obtained.

Comparative Example 4

The same procedure as that of Comparative Example 1 was repeated except that 1,1-bis-(4-hydroxyphenyl)-3,3,5-trimethylcyclohexane was replaced with 84 parts of terpene diphenol (YP-90; a product of Yasuhara Chemical Co., Ltd.). As a result, 110 parts of an epoxy resin (R4) was obtained.

Comparative Example 5

The same procedure as that of Comparative Example 1 was repeated except that 1,1-bis-(4-hydroxyphenyl)-3,3,5-trimethylcyclohexane was replaced with 100 parts of phenol/biphenyldimethanol polycondensate (softening point: 155° C.) and that the amounts of both epichlorohydrin and MIBK were altered to 250 parts. As a result, 118 parts of an epoxy resin (R5) was obtained.

Comparative Example 6

The same procedure as that of Comparative Example 1 was repeated except that 1,1-bis-(4-hydroxyphenyl)-3,3,5-trimethylcyclohexane was replaced with 51 parts of phenol/salicyl aldehyde polycondensate (softening point: 110° C., ICI viscosity: 9.2 P). As a result, 75 parts of an epoxy resin (R6) was obtained.

The properties of the modified epoxy resins of the present invention and comparative epoxy resin obtained in the above Examples and Comparative Examples are shown in Tables 1 to 3.

TABLE 1

| Examples | 1 | 2 | 3 | 4 | 5 |
|---|---|---|---|---|---|
| Epoxy equivalent (g/eq) | 211 | 215 | 219 | 221 | 226 |
| Softening point (° C.) | 87 | 89 | 93 | 84 | 89 |
| Melt viscosity (P) | 0.3 | 0.4 | 0.5 | 0.5 | 0.6 |

TABLE 2

| Examples | 6 | 7 | 8 | 9 | 10 | 11 |
|---|---|---|---|---|---|---|
| Epoxy equivalent (g/eq) | 233 | 228 | 256 | 166 | 166 | 165 |
| Softening point (° C.) | 81 | 79 | 97 | 86 | 86 | 87 |
| Melt viscosity (P) | 0.5 | 0.3 | 0.6 | 0.5 | 0.5 | 0.5 |

TABLE 3

| Comparative Examples | 1 | 2 | 3 | 4 | 5 | 6 |
|---|---|---|---|---|---|---|
| Epoxy equivalent (g/eq) | 236 | 242 | 232 | 242 | 262 | 168 |
| Softening point (° C.) | 54 | 55 | 52 | 49 | 61 | 54 |
| Melt viscosity (P) | 0.4 | 0.6 | 0.5 | 0.4 | 0.8 | 0.8 |

Examples 12 and 13 and Comparative Examples 7 and 8

1 (one) hydroxyl group equivalent of a curing agent [a phenol novolak resin (PN-80; a product of Nippon Kayaku Co., Ltd. having an melt viscosity at 150° C. of 1.5 P, softening point of 86° C. and hydroxyl group equivalent of 106 g/eq)] was added to 1 epoxy group equivalent of each of the modified epoxy resins (E2) and (E5) obtained in the Examples and epoxy resins (R1) and (R2) obtained in the Comparative Examples.

Then 1 part of a curing accelerator (triphenylphosphine) was added to 100 parts of the epoxy resin. A resin molding was prepared from the resultant mixture by the transfer molding and cured at 160° C. for 2 hours and then at 180° C. for 8 hours.

The properties of the cured product thus obtained are determined to obtain the results shown in Table 4.

TABLE 4

| | Ex. | | Comp. Ex. | |
|---|---|---|---|---|
| | 12 | 13 | 7 | 8 |
| Epoxy resin | E2 | ES | R1 | R2 |
| Glass transition temp. (° C.) | 149 | 136 | 148 | 137 |
| Copper foil peeling strength (kg/cm) | 2.5 | 2.7 | 2.4 | 2.6 |
| Izod impact test value (kg/mm$^2$) | 17 | 23 | 16 | 20 |

The properties were determined under the following conditions (the same shall apply in Examples 17 to 19 and Comparative Examples 12 to 14):

Glass transition temperature (TMA): TM-7000 (a product of Shinku-Riko Inc.) temperature elevation rate: 2° C./min Copper foil peeling strength: determined according to JIS C-6481 (peeling strength) Izod impact test value: determined according to JIS K 7710.

Example 14

96 parts of an o-cresol novolak (softening point: 80° C., 14 wt. % of dinuclear component, 16 wt. % of trinuclear component and 15 wt. % of tetranuclear component), 18.6 parts of 4,4'-hydroxybiphenyl, 400 parts of ECH and 100 parts of dimethyl sulfoxide were fed into a reactor, and heated and stirred to obtain a solution. 100 parts of 40% aqueous sodium hydroxide solution was continuously dropped therein for a period of 4 hours while the temperature was kept at 45° C. and the pressure in the reactor was kept at 45 Torr. In the course of the reaction, ECH and water distilled off by the azeotropy were cooled and separated from each other, and only ECH which was in the organic layer was returned. After the completion of the dropping of the aqueous sodium hydroxide solution, the reaction was conducted at 45° C. for 2 hours and at 70° C. for 30 minutes to obtain a reaction mixture. Then, the reaction mixture was repeatedly washed with water to remove salts formed as the by-products and dimethyl sulfoxide, excess epichlorohydrin was distilled out of the oil layer by heating under reduced pressure. 300 parts of methyl isobutyl ketone was added to the residue to obtain a solution.

The solution in methyl isobutyl ketone was heated to 70° C., and 5 parts of 30 wt. % aqueous sodium hydroxide solution was added to the solution. After conducting the reaction for 1 hour, the reaction solution was repeatedly washed with water until the wash solution had become neutral. Then methyl isobutyl ketone was distilled out of the oil layer by heating under reduced pressure to obtain 154 parts of the modified epoxy resin (E12) of the present invention. The modified epoxy resin (E12) thus obtained had an epoxy equivalent of 189, softening point of 89° C. and melt viscosity of 0,4 P.

Example 15

The same procedure as that of Example 1 was repeated in Example 14 except that the o-cresol novolak was replaced with another o-cresol novolak having a softening point of 83° C. and containing 5% by weight of the dinuclear component, 25% by weight of trinuclear component and 26% by weight of tetranuclear component. As a result, 152 parts of the modified epoxy resin (E13) of the present invention was obtained. The modified epoxy resin (E13) thus obtained had an epoxy equivalent of 192, softening point of 88° C. and melt viscosity of 0.6 P.

Example 16

The same procedure as that of Example 12 was repeated in Example 14 except that the o-cresol novolak was replaced with another o-cresol novolak having a softening point of 91 and containing 3% by weight of the dinuclear component, 8% by weight of trinuclear component and 39% by weight of tetranuclear component. As a result, 151 parts of the modified epoxy resin (E14) of the present invention was obtained. The modified epoxy resin (E14) thus obtained had an epoxy equivalent of 191 g/eq, softening point of 91° C. and melt viscosity of 1.1 P.

Comparative Example 9

The same procedure as that of Example 12 was repeated in Example 14 except that 4,4'-diydroxybiphenyl was not used and 120 parts of only o-cresol novolak was used. As a result, 162 parts of an epoxy resin (R7) was obtained.

Comparative Example 10

The same procedure as that of Example 13 was repeated in Example 15 except that 4,4'-diydroxybiphenyl was not used and 120 parts of only o-cresol novolak was used. As a result, 162 parts of an epoxy resin (R8) was obtained.

Comparative Example 11

The same procedure as that of Example 14 was repeated in Example 16 except that 4,4'-diydroxybiphenyl was not used and 120 parts of only o-cresol novolak was used. As a result, 162 parts of an epoxy resin (R9) was obtained.

The properties and blocking resistance of the epoxy resins (E12) to (E14) obtained in Examples 14 to 16 and epoxy resins (R7) to (R9) obtained in Comparative Examples 9 to 11 were tested to obtain the results shown in Table 5.

TABLE 5

|  | Ex. | | | Comp. Ex. | | |
| --- | --- | --- | --- | --- | --- | --- |
|  | 14 | 15 | 16 | 9 | 10 | 11 |
| Epoxy equivalent (g/eq) | 189 | 192 | 189 | 196 | 194 | 191 |
| Softening point (° C.) | 89 | 88 | 91 | 55 | 55 | 62 |
| Melt viscosity (P) | 0.4 | 0.6 | 1.1 | 0.9 | 0.8 | 1.6 |
| Blocking resistance | ○ | ⊚ | ⊚ | x | x | Δ |

Examples 17 to 19 and Comparative Examples 12 to 14

1 (one) hydroxyl group equivalent of a curing agent [PN-80 (a phenol novolak resin produced by Nippon Kayaku Co., Ltd.) having an melt viscosity at 150° C. of 1.5 P, softening point of 86 and hydroxyl group equivalent of 106 g/eq)] was added to 1 epoxy group equivalent of each of the modified epoxy resins (E12) to (E14) obtained in the Examples and the epoxy resins (R7) to (R9) obtained in Comparative Examples. Then 1 part of a curing accelerator (triphenylphosphine), for 100 parts of the epoxy resin, was added to the obtained mixture. A resin molding was prepared by the transfer molding method and then cured at 160° C. for 2 hours and then at 180° C. for 8 hours.

The properties of the cured product thus obtained were determined to obtain the results shown in Table 6.

TABLE 6

|  | Ex. | | | Comp. Ex. | | |
| --- | --- | --- | --- | --- | --- | --- |
|  | 17 | 18 | 19 | 12 | 13 | 14 |
| Epoxy resin | E12 | E13 | E14 | R7 | R8 | R9 |
| Glass transition temp. (° C.) | 146 | 151 | 157 | 147 | 152 | 159 |
| Izod impact test value (kg/mm²) | 13 | 14 | 15 | 11 | 13 | 14 |
| Copper foil peeling strength (kg/cm) | 2.4 | 2.3 | 2.5 | 2.4 | 2.2 | 2.4 |

Example 20

The same procedure as that of Example 2 was repeated in Example 8 except that the compound of the formula (3) was replaced with 64 parts of a compound of the same formula having a softening point of 80° C. and m=1.3 and the amounts of 4,4'-diydroxybiphenyl and 40% aqueous sodium hydroxide solution were altered to 12 parts and 44 parts, respectively. As a result, 95 parts of a modified epoxy resin (E15) of the present invention was obtained. The modified epoxy resin (E15) thus obtained had an epoxy equivalent of 255, softening point of 90° C. and melt viscosity of 0.8 P.

Examples 21 to 24 and Comparative Examples 15 to 18

Each of the modified epoxy resins (E12) to (E15) obtained in the Examples and epoxy resins (R7) to (R9) and YX-4000

(a product of Yuka Shell Epoxy K.K.; epoxy equivalent: 196) [hereinafter referred to as (R10)] as the epoxy resin was mixed with a curing agent [PN-80 (a phenol novolak resin; a product of Nippon Kayaku Co., Ltd.) having a softening point of 86° C.], curing accelerator (triphenylphosphine), silane coupling agent (KBM 403; a product of Shin-Etsu Chemical Co., Ltd.), mold-releasing agent (finely pulverized carnauba; a product of Toa Kasei K.K.), antimony trioxide, brominated epoxy resin (BREN-S; a product of Nippon Kayaku Co., Ltd.) and spherical silica (average particle diameter: 30 μm) and pulverized silica (average particle diameter: 5 μm) in a proportion (parts) given in Table 7, kneaded with a double-screw roll, pulverized and tableted. The spiral flow of the product was determined under the following conditions to obtain the results shown in Tables 8 and 9:

Mold: a mold according to EMMI-1-66

Mold temperature: 170° C.

Transfer pressure: 70 kg/cm$^2$

TABLE 7

|  | Ex. | | | | Comp. Ex. | | | |
| --- | --- | --- | --- | --- | --- | --- | --- | --- |
|  | 21 | 22 | 23 | 24 | 15 | 16 | 17 | 18 |
| Epoxy resin | E12 | E13 | E14 | E15 | R7 | R8 | R9 | R10 |
|  | 62 | 62 | 62 | 66 | 63 | 63 | 62 | 63 |
| Curing agent | 35 | 35 | 35 | 31 | 34 | 34 | 35 | 34 |
| Curing accelerator | 1 | 1 | 1 | 1.3 | 1 | 1 | 1 | 1.3 |
| Silane coupling agent | 7 | 7 | 7 | 7 | 7 | 7 | 7 | 7 |
| Mold-releasing agent | 4 | 4 | 4 | 4 | 4 | 4 | 4 | 4 |
| Antimony trioxide | 6 | 6 | 6 | 6 | 6 | 6 | 6 | 6 |
| Brominated epoxy resin | 15 | 15 | 15 | 15 | 15 | 15 | 15 | 15 |
| Spherical silica | 610 | 610 | 610 | 610 | 610 | 610 | 610 | 610 |
| Pulverized silica | 260 | 260 | 260 | 260 | 260 | 260 | 260 | 260 |

A resin mold was prepared from the tablets obtained as described above by the transfer molding method under conditions comprising 175° C. and 120 sec. Immediately thereafter, the properties thereof were determined as described below to obtain the results shown in Tables 8 and 9:

Hardness of hot molding: The hardness of the molding was determined with a Shore hardness meter (D type) immediately after the molding. The test pieces were the same as those used for determinating the water absorption as described below.

The obtained resin molding was postcured at 160° C. for 2 hours and then at 180° C. for 8 hours, and the following properties thereof were examined:

Glass transition temperature: determined in the same manner as that of Examples 10 and 11.

Water absorption: the weight gain (%) after boiling a test piece in the form of a disk having a diameter of 50 mm and thickness of 4 mm in 100° C. water for 24 hours.

A 16-pin 42 alloy lead frame loaded with silicon chips was encapsulated with the above-described tablets by the transfer molding under conditions comprising 175° C., 120 seconds and 70 kg/cm$^2$ and then postcured at 160° C. for 2 hours and then at 180° C.; for 8 hours. The properties of the SOP simulated element thus obtained were determined to obtain the results shown in Tables 8 and 9.

Reflow cracking properties: The sample was moisturized under conditions of 85° C./85% RH for a predetermined period of time and then immersed in a soldering bath at 260° C. for 10 seconds. The outside cracks and the peeling on both surfaces of the die pad were examined and the number of the defects was counted.

Temperature cycle test: After repeating the temperature cycle tests (−50° C./30 minutes to 150° C./30 minutes) 200 times, the outside cracks and the peeling on both surfaces of the die pad were examined and the number of the defects was counted.

TABLE 8

| Example | 21 | 22 | 23 | 24 |
| --- | --- | --- | --- | --- |
| Epoxy resin | E12 | E13 | E14 | E15 |
| Spiral flow (inch) | 33 | 32 | 30 | 34 |
| Hardness of hot molding | 85 | 85 | 85 | 80 |
| Glass transition temperature (° C.) | 147 | 151 | 157 | 140 |
| Water absorption (%) | 0.22 | 0.23 | 0.22 | 0.20 |
| Reflow cracking properties (number of defects/number of test samples) | | | | |
| Moisturization time: 24 h | 0/20 | 0/20 | 0/20 | 0/20 |
| Moisturization time: 48 h | 1/20 | 2/20 | 2/20 | 0/20 |
| Moisturization time: 72 h | 2/20 | 5/20 | 4/20 | 0/20 |
| Temperature cycle test (number of defects/number of test samples) | | | | |
|  | 1/20 | 0/20 | 1/20 | 0/20 |

TABLE 9

| Comparative Example | 15 | 16 | 17 | 18 |
| --- | --- | --- | --- | --- |
| Epoxy resin | R7 | R8 | R9 | R10 |
| Spiral flow (inch) | 25 | 23 | 23 | 33 |
| Hardness of hot molding | 80 | 80 | 85 | 75 |
| Glass transition temperature (° C.) | 147 | 153 | 158 | 130 |
| Water absorption (%) | 0.22 | 0.22 | 0.23 | 0.22 |
| Reflow cracking properties (number of defects/number of test samples) | | | | |
| Moisturization time: 24 h | 2/20 | 5/20 | 4/20 | 0/20 |
| Moisturization time: 48 h | 7/20 | 11/20 | 10/20 | 0/20 |
| Moisturization time: 72 h | 20/20 | 20/20 | 20/20 | 0/20 |
| Temperature cycle test (number of defects/number of test samples) | | | | |
|  | 17/20 | 19/20 | 19/20 | 0/20 |

It is apparent from Tables 1 to 6 that the modified epoxy resins of the present invention have a higher softening point and are more excellent in the workability and the storability of the composition than those of the comparative epoxy resins (an unmodified epoxy resin) obtained by epoxidizing only the compound of the formula (1), while the properties of the cured, modified epoxy resins of the present invention are substantially the same as those of the comparative epoxy resin. Particularly when the modified epoxy resin of the present invention is used for forming the composition for encapsulating semiconductors, the high filling of the resin with a filler to a high extent is even made possible while it was impossible in the prior art, and the product is superior, in the moldability and heat resistance, to an ordinarily used epoxy resin highly filled with the filler while the merits of the unmodified epoxy resin are still kept as will be understood from Tables 8 and 9, since the viscosity of the modified epoxy resin is lower than that of the unmodified epoxy resins.

EFFECT OF THE INVENTION

The modified epoxy resin of the present invention has a high softening point, excellent workability and storability (being not blocked) and a low melt viscosity. Therefore, the modified epoxy resin of the present invention is very useful for producing insulating materials for electric and electronic elements (such as high reliability semiconductor-encapsulating materials), laminated plates (such as printed-wiring boards), various composite materials typified by CFRP, adhesives and coating materials.

We claim:

1. A modified epoxy resin obtained by the glycidation of a mixture of (a) a phenol compound represented by the formula (1):

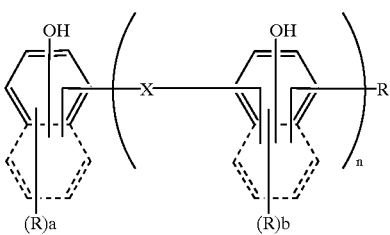

wherein X represents a hydrocarbon group or hydroxyhydrocarbon group having 1 to 14 carbon atoms, a represents an integer of 1 to 6, b represents an integer of 1 to 5, R's represent a hydrogen atom, a halogen atom, a hydrocarbon group having 1 to 8 carbon atoms or an aryl group independently from each other, and a group:

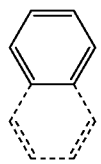

represents a benzene ring and/or a naphthalene ring and the group —X—, the group —OH and the group —R bond at an optional carbon atom on the benzene ring or the naphthalene ring, and n represents an average number which is 1 to 10 and (b) 1,1'-biphenyl-4,4'-diol, and having a softening point of not higher than 120° C. and not lower than 60° C., wherein the component (a) and the component (b) are contained in the mixture in a component (b) to component (a) ratio by weight of below 0.25 and at least 0.05.

2. The modified epoxy resin according to claim 1, wherein [1.6×the amount by weight of the component (b) in the mixture of components (a) and (b)]/{[the amount by weight of the component (a) in the mixture of components (a) and (b)]×[1+56/hydroxyl group equivalent of component (a)]} is not higher than 0.3.

3. The modified epoxy resin according to claim 1 or 2, wherein X in the formula (1) is a hydrocarbon group having 8 to 14 carbon atoms.

4. The modified epoxy resin according to claim 1, wherein the compound of the formula (1) is 1,1,-bis-(4-hydroxyphenyl)-3,3,5-trimethyl-cyclohexane.

5. The modified epoxy resin according to claim 1, wherein the compound of the formula (1) is that represented by the formula (2):

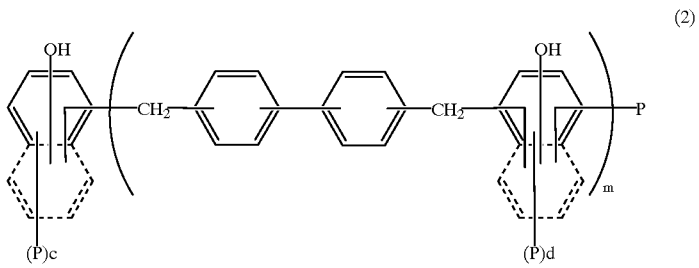

wherein c represents an integer of 1 to 6, d represents an integer of 1 to 5, P's represent a hydrogen atom, a halogen atom, a hydrocarbon group having 1 to 8 carbon atoms or an aryl group independently from each other, and m represents an average number which is 1 to 10.

6. The modified epoxy resin according to claim 1, wherein the component (a) is an alkylphenol novolak.

7. The modified epoxy resin according to claim 6, wherein the component (a) is o-cresol novolak.

8. The modified epoxy resin according to claim 6 or 7, wherein the value of (weight of the dinuclear component)/(weight of the trinuclear component) is not higher than 0.4.

9. The modified epoxy resin according to claim 6, wherein the relative amount of the tetranuclear component is at least 30% by weight and the relative amount of the total of mononuclear to trinuclear components is not larger than 20% by weight in the component (a).

10. The modified epoxy resin according to claim 6, wherein the component (a) is an alkylphenol novolak obtained by condensing an alkylphenol with formaldehyde in the presence of a hydroxycarboxylic acid having a carboxyl group and an alcoholic hydroxyl group in the molecule as the catalyst.

11. The modified epoxy resin according to claim 7, wherein the component (a) is an o-cresol novolak having a softening point of not higher than 100° C.

12. An epoxy rein composition containing the modified epoxy resin as set forth in any of claims 1, 2, 4, 5, 6, 7, 9, 10 or 11.

13. The epoxy resin composition according to claim 12, which is prepared for encapsulating a semiconductor.

14. A cured composition produced by curing the epoxy resin composition as set forth in claim 12.

15. An epoxy rein composition containing the modified epoxy resin as set forth in claim 3.

16. An epoxy rein composition containing the modified epoxy resin as set forth in claim 8.

17. A cured composition produced by curing the epoxy resin composition as set forth in claim 13.

* * * * *